US012548916B2

(12) United States Patent
Lu et al.

(10) Patent No.: US 12,548,916 B2
(45) Date of Patent: Feb. 10, 2026

(54) FEED STRUCTURE OF ANTENNA, ANTENNA, AND COMMUNICATION SYSTEM

(71) Applicant: HUAWEI TECHNOLOGIES CO., LTD., Guangdong (CN)

(72) Inventors: Junfeng Lu, Xi'an (CN); Li Jin, Xi'an (CN); Liwan Zhang, Xi'an (CN); Shuangfei Wang, Xi'an (CN)

(73) Assignee: Huawei Technologies Co., LTD., Shenzhen (CN)

( * ) Notice: Subject to any disclaimer, the term of this patent is extended or adjusted under 35 U.S.C. 154(b) by 286 days.

(21) Appl. No.: 18/339,863

(22) Filed: Jun. 22, 2023

(65) Prior Publication Data

US 2023/0352848 A1 Nov. 2, 2023

Related U.S. Application Data

(63) Continuation of application No. PCT/CN2020/139035, filed on Dec. 24, 2020.

(51) Int. Cl.
*H01Q 21/00* (2006.01)
*H01Q 1/36* (2006.01)

(52) U.S. Cl.
CPC .......... *H01Q 21/0006* (2013.01); *H01Q 1/36* (2013.01)

(58) Field of Classification Search
CPC .......... H01Q 1/24; H01Q 1/241; H01Q 1/243; H01Q 1/36; H01Q 11/04; H01Q 21/00; H01Q 21/0006; H01Q 21/08
See application file for complete search history.

(56) References Cited

U.S. PATENT DOCUMENTS

| | | | | |
|---|---|---|---|---|
| 6,466,176 B1 * | 10/2002 | Maoz | ........................ | H01Q 1/38 343/702 |
| 2020/0227834 A1 * | 7/2020 | Yman | .................... | H01Q 21/26 |
| 2020/0303838 A1 * | 9/2020 | Xiao | ........................ | H01Q 3/32 |
| 2022/0007503 A1 * | 1/2022 | Liu | .......................... | H01Q 1/12 |

FOREIGN PATENT DOCUMENTS

| | | |
|---|---|---|
| CN | 109841963 A * | 6/2019 |
| CN | 111384600 A | 7/2020 |
| CN | 111403893 A | 7/2020 |
| WO | 2020218837 A1 | 10/2020 |

OTHER PUBLICATIONS

International Search Report and Written Opinion in International Appln. No. PCT/CN2020/139035, mailed on Sep. 27, 2021, 15 pages (with English translation).
Extended European Search Report in European AppIn No. 20966479.6, dated Dec. 5, 2023, 10 pages.

* cited by examiner

*Primary Examiner* — Thai Pham
(74) *Attorney, Agent, or Firm* — Fish & Richardson P.C.

(57) ABSTRACT

The present disclosure relates to feed structures of antennas, antennas, and communication devices. One example feed structure includes a first cavity with a first signal cable and a second cavity with a second signal cable. The first signal cable includes a first main part and a first elastic bending part located at one end of the first main part. The first main part extends along a first direction. An extension direction of the first elastic bending part intersects with the first direction, and the first elastic bending part can be deformed towards the extension direction of the first main part. A first hole is provided between the first cavity and the second cavity. The first cavity and the second cavity are connected through the first hole.

20 Claims, 12 Drawing Sheets

FEED STRUCTURE OF ANTENNA, ANTENNA, AND COMMUNICATION SYSTEM

CROSS-REFERENCE TO RELATED APPLICATIONS

This application is a continuation of International Application No. PCT/CN2020/139035, filed on Dec. 24, 2020, the disclosure of which is hereby incorporated by reference in its entirety.

TECHNICAL FIELD

This application relates to the field of antenna technologies, and in particular, to a feed structure of an antenna, an antenna, and a communication system.

BACKGROUND

With rapid development of mobile communication technologies, a stricter technical requirement is imposed on an entire communication system architecture. The communication system requires not only efficient, fast, and large-capacity communication, but also a high degree of integration, miniaturization, and lightweight. An antenna plays an important role in the communication system. As an integration level of a feed network inside a base station antenna is increasingly high, a requirement for an electrical connection between modules inside the base station antenna becomes higher. In some scenarios, electrical connections between modules on different planes or in different cavities need to be implemented. Currently, a common signal transfer solution in the industry is as follows: Two or three cavities are horizontally placed, and a radio frequency transmission cable is placed in each cavity. Radio frequency transmission cables in different cavities are located on a same plane. Usually, the radio frequency transmission cables in the different cavities are electrically connected by using a jumper or a horizontal strip. This signal transfer solution is not applicable to an electrical connection on a vertical plane, requires that the cavities be set larger, and is not conducive to miniaturization and lightweight of the antenna.

SUMMARY

This application provides a feed structure of an antenna that can save space and reduce mass.

According to a first aspect, this application provides a feed structure of an antenna. The feed structure includes: a first cavity, a second cavity, a first signal cable, and a second signal cable, where the first signal cable is located in the first cavity, the first signal cable includes a first main part and a first elastic bending part located at one end of the first main part, the first main part extends along a first direction, an extension direction of the first elastic bending part intersects with the first direction, and the first elastic bending part can be deformed towards the extension direction of the first main part; the second signal cable is located in the second cavity, a first hole is provided between the first cavity and the second cavity, the first cavity and the second cavity are connected through the first hole, a length of the first elastic bending part in a second direction is greater than a length of the first cavity in the second direction, the second direction intersects with the first direction, and one end of the first elastic bending part away from the first main part is connected to the second signal cable through the first hole.

The first signal cable and the second signal cable are used to transmit signals. That the extension direction of the first elastic bending part intersects with the first direction is that the first elastic bending part is bent towards one side relative to the first main part. In this implementation, the first elastic bending part is bent towards the second cavity relative to the first main part. In an implementation, the extension direction of the first elastic bending part is perpendicular to the extension direction of the first main part. In some implementations, an angle between the extension direction of the first elastic bending part and the extension direction of the first main part ranges from 60° to 90°. In some implementations, the angle between the extension direction of the first elastic bending part and the extension direction of the first main part ranges from 30° to 60°. The length of the first elastic bending part in the second direction is greater than the length of the first cavity in the second direction, so that when the first signal cable is placed into the first cavity from one end of the first cavity, the first elastic bending part needs to be deformed in the extension direction of the first main part. In other words, the first elastic bending part is squeezed in the first cavity in a compressed state, and then is continuously pushed towards the first cavity until the first elastic bending part reaches a location of the first hole. The first elastic bending part is restored to an original shape, and therefore the first elastic bending part is not in the compressed state. One end of the first elastic bending part away from the first main part extends into the second cavity through the first hole. In this application, the length of the first elastic bending part in the second direction is greater than the length of the first cavity in the second direction. In other words, the length of the first cavity in the second direction may be set smaller, and space is saved and weight is reduced.

According to the feed structure of the antenna provided in this application, in one aspect, the deformable first elastic bending part is disposed at one end of the first signal cable. When the deformable first elastic bending part extends into the first cavity in the compressed state, the length of the first cavity in the second direction may be set smaller, and space of the feed structure is saved and weight is reduced. In another aspect, when the first elastic bending part is pushed into the first hole, the first elastic bending part that is restored to an original shape is pushed into the first hole when being pushed to the location of the first hole, so that the first elastic bending part and the second signal cable are easily installed and connected.

In a possible implementation, the first main part and the first elastic bending part are integrally formed. The first elastic bending part may extend into the second cavity and may be connected to the second signal cable through the first hole. Only the end of the first elastic bending part away from the first main part needs to be welded to the second signal cable. In other words, there is one welding joint. This improves signal transmission characteristics and structure strength.

In a possible implementation, the first elastic bending part includes a first bending sub-part and a second bending sub-part, the first bending sub-part is located between the second bending sub-part and the first signal cable, an extension direction of the first bending sub-part intersects with the first direction, and the second bending sub-part is electrically connected to the second signal cable. An extension direction of the second bending sub-part and the extension direction of the first bending sub-part may be at any angle to adapt to second signal cables of different shapes in the second cavity or signal cables in cavities at different locations, or adapt to different location parts of the second signal cable or different plane parts of the second signal cable.

In a possible implementation, the extension direction of the second bending sub-part is parallel to an extension direction of the second signal cable. The extension direction of the second signal cable is an entire extension direction of the second signal cable. A contact area of the second bending sub-part and the second signal cable may be increased, to improve signal transmission stability and the structure strength. In an implementation, an extension direction of the second signal cable and the second bending sub-part is the first direction. In some implementations, an area of the second bending sub-part may be set larger, to increase a connection contact area.

In a possible implementation, the second signal cable includes a connection part, where the connection part is for connecting to the first signal cable, and the extension direction of the second bending sub-part is parallel to an extension direction of the connection part. The extension direction of the second bending sub-part may not be parallel to the extension direction of the second signal cable, but is parallel to the extension direction of the connection part, to increase a contact area of a signal connection location.

In a possible implementation, a connection hole penetrating the first elastic bending part is disposed on the first elastic bending part, a convex part is disposed on the second signal cable, and the convex part passes through the connection hole. The connection hole is disposed on the second bending sub-part. The convex part and the connection hole may be used to fasten the second bending sub-part and the second signal cable when welding the second bending sub-part and the second signal cable. This prevents the second bending sub-part and the second signal cable from shaking in a welding process, which is unfavorable to welding.

In a possible implementation, the second signal cable includes a second main part and a second elastic bending part located at one end of the second main part, the second main part extends along a third direction, an extension direction of the second elastic bending part intersects with the third direction, the second elastic bending part can be deformed towards the extension direction of the second main part, and the first elastic bending part and the second elastic bending part are connected through the first hole. The first signal cable and the second signal cable are connected through respective elastic bending parts of the first signal cable and the second signal cable to implement a signal connection. In some implementations, an extension direction of the first cavity is the same as an extension direction of the second cavity. A third direction is parallel to the first direction, or an extension direction of the first signal cable is parallel to an extension direction of the second signal cable. The extension direction of the second elastic bending part is parallel to the extension direction of the first elastic bending part. The second elastic bending part and the first elastic bending part may be superimposed together and then may be connected by welding. In some implementations, an angle may be provided between the third direction and the first direction.

In a possible implementation, the second elastic bending part is located in the second cavity, and a connection part between the first elastic bending part and the second elastic bending part is located in the second cavity. The entire second signal cable may be located in the second cavity. In some implementations, a first connection groove may be disposed on a side wall of the second cavity, and the first elastic bending part and the second elastic bending part are welded inside the second cavity through the first connection groove. The side wall on which the groove is disposed is different from a side wall on which the first hole is located.

In a possible implementation, one end of the second elastic bending part away from the second main part passes through the first hole, and a connection part between the first elastic bending part and the second elastic bending part is located in the first cavity. The end of the second elastic bending part away from the second main part is located in the first cavity. In some implementations, a second connection groove may be disposed on a side wall of the first cavity, and the first elastic bending part and the second elastic bending part are welded inside the first cavity through the second connection groove. The side wall on which the second connection groove is located is different from a side wall on which the first hole is located.

In a possible implementation, one end of the second elastic bending part away from the second main part passes through the first hole, and a connection part between the first elastic bending part and the second elastic bending part is located in the first hole. The first hole is disposed on a side wall shared between the first cavity and the second cavity, or is disposed on adjacent side walls between the first cavity and the second cavity. In an implementation, the side wall shared between the first cavity and the second cavity is a common side wall, and the common side wall is perpendicular to a plane in which the first direction and the second direction are located. The common side wall has a specific thickness. A length of the first hole is the same as the thickness of the common side wall. A length direction of the first hole is the same as the extension direction of the first elastic bending part. A third connection groove may be disposed on the common side wall between the first cavity and the second cavity, and the first elastic bending part and the second elastic bending part are welded inside the first hole through the third connection groove.

In a possible implementation, the feed structure further includes a third cavity and a third signal cable, the third signal cable is located in the third cavity, the third cavity and the second cavity are disposed in parallel on one side of the first cavity, a second hole is provided between the first cavity and the third cavity, the first cavity and the third cavity are connected through the second hole, the first signal cable further includes a third elastic bending part located at one end of the first main part, a length of the third elastic bending part in the second direction is greater than a length of the first cavity in the second direction, and one end of the third elastic bending part away from the first main part is connected to a third signal through the second hole.

In some implementations, the feed structure further includes the third cavity and the third signal cable. The third signal cable is located in the third cavity. The third cavity and the second cavity are disposed in parallel on one side of the first cavity. The second hole is provided between the first cavity and the third cavity. The third signal cable includes a third main part and a fourth elastic bending part located at one end of the third main part. One end of the fourth elastic bending part away from the third main part is connected to the first signal cable through the second hole.

In this application, the first cavity, the second cavity, and the third cavity may further include functional units such as a phase shifter, a filter unit, a combiner unit, a power splitting unit, or a radiating element, in another feed structure. This is not limited in this application. The first cavity, the second cavity, and the third cavity may be cavities in a feed structure that are used to accommodate the phase shifter, the filter unit, the combiner unit, the power splitting unit, or the radiating element. In other words, the cavities are provided in the feed structure. The first elastic bending part in the first signal cable in the feed structure provided in this application may be applicable to any structure that needs to connect signals in two cavities, and may be applicable to between two cavities deformed at any location or between two cavities deformed in shape. When there are a plurality of signal cables and elastic bending parts, the first elastic bending part may be applicable to connections of signal cables in a plurality of cavities.

In this application, the first elastic bending part may be formed by bending one end of the first signal cable, to be specific, a material for forming the first signal cable has specific deformation and can transmit a radio frequency signal. Alternatively, the first elastic bending part is integrally formed by one end of the first main part of a material with a deformation capability, where the material forming the first elastic bending part not only has the specific deformation, but also can transmit the radio frequency signal. Similarly, the second elastic bending part may be formed by bending one end of the second signal cable, and a material for forming the second signal cable has specific deformation and can transmit a radio frequency signal. Alternatively, the second elastic bending part is integrally formed by one end of the second main part of a material with a deformation capability, where the material forming the second elastic bending part not only has the specific deformation, but also can transmit the radio frequency signal. The first signal cable, the second signal cable, and the third signal cable may be a metal strip line or a PCB board, where the metal strip line may be a sheet metal strip line.

The location of the first hole may be set based on an actual location at which the first signal cable and the second signal cable need to be connected. In this embodiment, the first hole is disposed on the common side wall of the first cavity and the second cavity. In some implementations, holes may alternatively be separately disposed at corresponding locations of the first cavity and the second cavity. The first elastic bending part may pass through the corresponding holes of the first cavity and the second cavity. In this application, the first cavity, the second cavity, and the third cavity may be an extrude cavity or a plastic electroplating cavity.

According to a second aspect, this application provides an antenna, where the antenna includes the feed structure according to any one of the foregoing implementations.

According to a third aspect, this application provides a communication device, where the communication device includes a radio frequency processing unit and the foregoing antenna, and the radio frequency processing unit is electrically connected to the feed structure of the antenna.

DESCRIPTION OF EMBODIMENTS

Terms such as "first" and "second" in this specification are merely intended for a purpose of description, and shall not be understood as an indication or implication of relative importance or implicit indication of a quantity of indicated technical features. Therefore, a feature limited by "first" or "second" may explicitly or implicitly include one or more features. In the descriptions of this application, unless otherwise stated, "a plurality of" means two or more than two.

In addition, in this specification, position terms such as "up" and "down" are defined relative to positions of structures in the accompanying drawings. It should be understood that these position terms are relative concepts used for relative description and clarification, and may correspondingly change according to changes in the positions of the structures.

Figure 1:
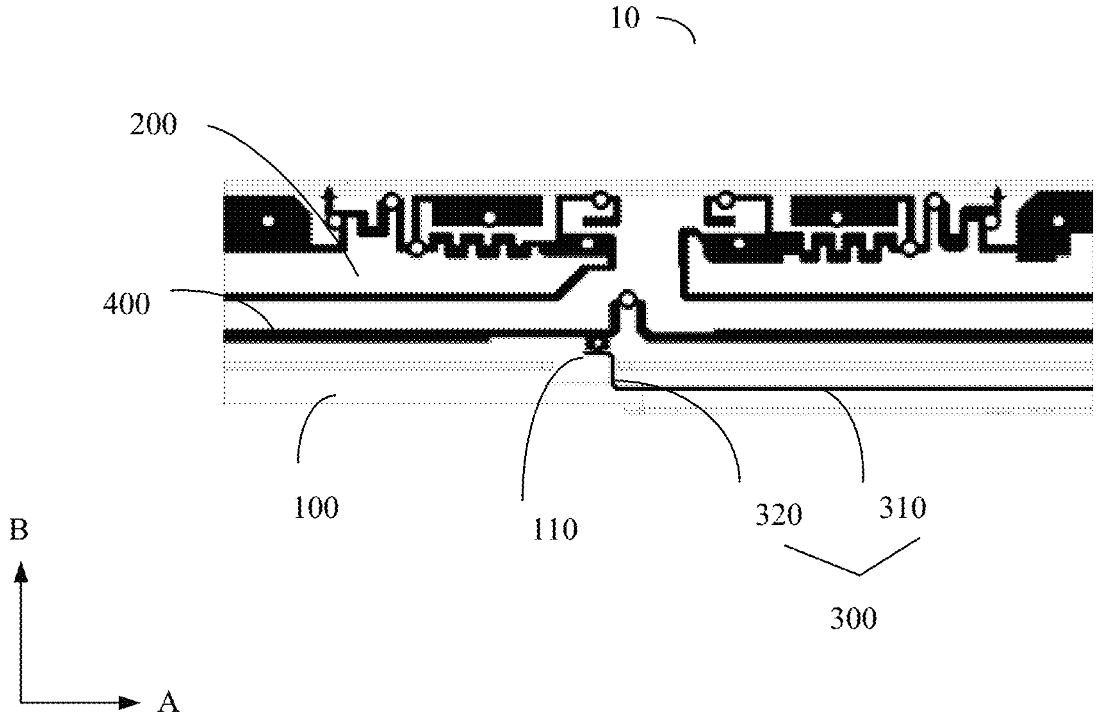
FIG. 1 is a schematic diagram of a structure of a feed structure of an antenna according to an implementation of this application.
Figure 2:
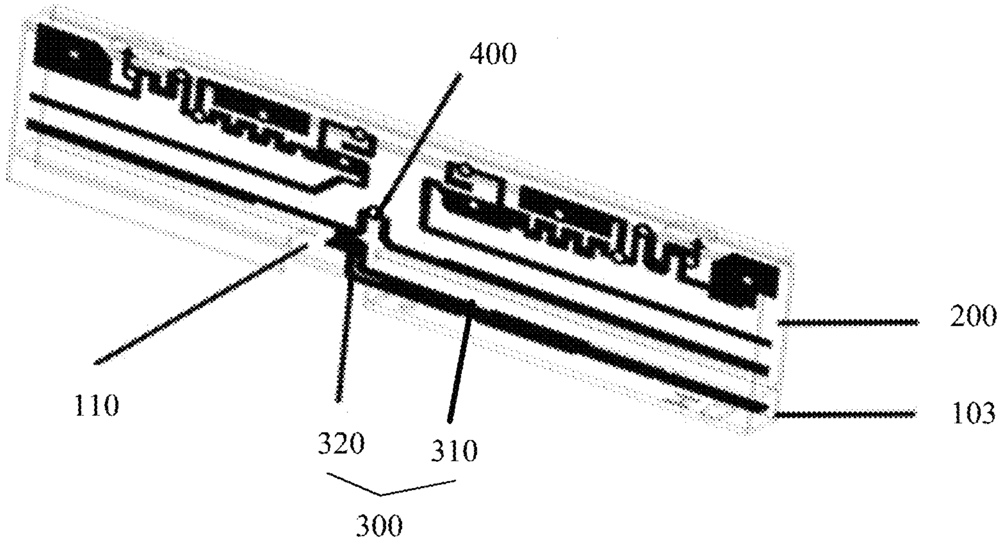
FIG. 2 is a schematic diagram of a three-dimensional structure of a feed structure of an antenna according to an implementation of this application.
Figure 3:
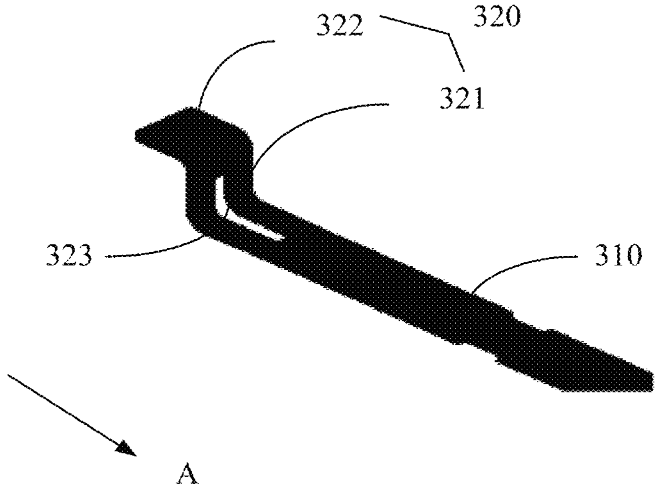
FIG. 3 is a schematic diagram of a structure of a first signal cable in a feed structure of an antenna according to an implementation of this application.

Refer to FIG. 1 to FIG. 3. An implementation of this application provides a feed structure 10 of an antenna 1, including a first cavity 100, a second cavity 200, a first signal cable 300, and a second signal cable 400. The first signal cable 300 is located in the first cavity 100. The first signal cable 300 includes a first main part 310 and a first elastic bending part 320 located at one end of the first main part 310. The first main part 310 extends along a first direction A. An extension direction of the first elastic bending part 320 intersects with the first direction A. The first elastic bending part 320 can be deformed towards the extension direction of the first main part 310. The second signal cable 400 is located in the second cavity 200. A first hole 110 is provided between the first cavity 100 and the second cavity 200. The first cavity 100 and the second cavity 200 are connected through the first hole 110. A length of the first elastic bending part 320 in a second direction B is greater than a length of the first cavity 100 in the second direction B. The second direction B intersects with the first direction A. One end of the first elastic bending part 320 away from the first main part 310 is connected to the second signal cable 400 through the first hole 110.

The first signal cable 300 and the second signal cable 400 are used to transmit signals. That the extension direction of the first elastic bending part 320 intersects with the first direction A is that the first elastic bending part 320 is bent towards one side relative to the first main part 310. In this implementation, the first elastic bending part 320 is bent towards the second cavity 200 relative to the first main part 310. In this implementation, the extension direction of the first elastic bending part 320 is perpendicular to the extension direction of the first main part 310. In some implementations, an angle between the extension direction of the first elastic bending part 320 and the extension direction of the first main part 310 ranges from 60° to 90°. In some implementations, the angle between the extension direction of the first elastic bending part 320 and the extension direction of the first main part 310 ranges from 30° to 60°. The length of the first elastic bending part 320 in the second direction B is greater than the length of the first cavity 100 in the second direction B, so that when the first signal cable 300 is placed into the first cavity 100 from one end of the first cavity 100, the first elastic bending part 320 needs to be deformed in the extension direction of the first main part 310. In other words, the first elastic bending part 320 is squeezed in the first cavity 100 in a compressed state, and then is continuously pushed towards the first cavity 100 until the first elastic bending part 320 reaches a location of the first hole 110. The first elastic bending part 320 is restored to an original shape, and therefore the first elastic bending part 320 is not in the compressed state. One end of the first elastic bending part 320 away from the first main part 310 extends into the second cavity 200 through the first hole 110. The first hole 110 is disposed on a side wall of the first cavity 100 in the second direction B, and at least a part of the first cavity 100 and at least a part of the second cavity 200 are disposed in parallel in the second direction B. In this embodiment, the first cavity 100 and the second cavity 200 are disposed in parallel and adjacent to each other in the second direction B. In this application, the length of the first elastic bending part 320 in the second direction B is greater than the length of the first cavity 100 in the second direction B. In other words, the length of the first cavity 100 in the second direction B may be set smaller, and space is saved and weight is reduced.

Figure 4:
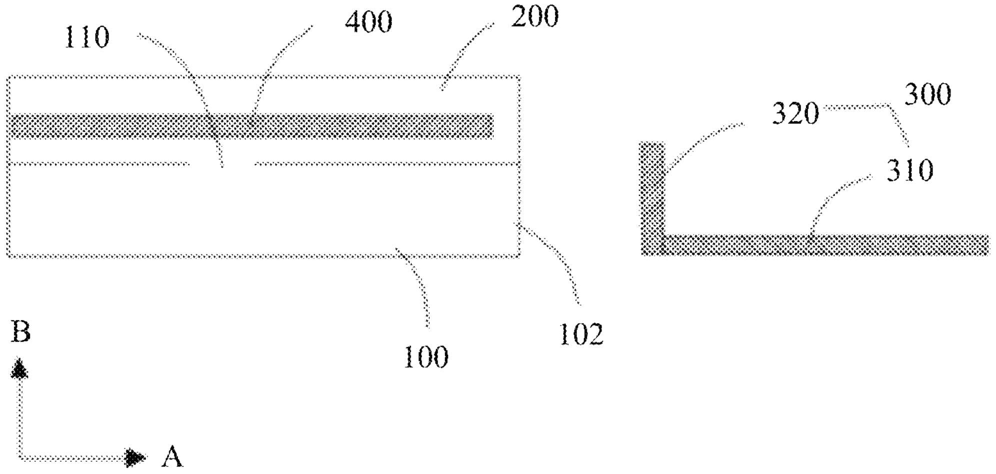
FIG. 4 is a schematic diagram of a scenario in which a first signal cable is not installed in a first cavity according to an implementation of this application.
Figure 5:
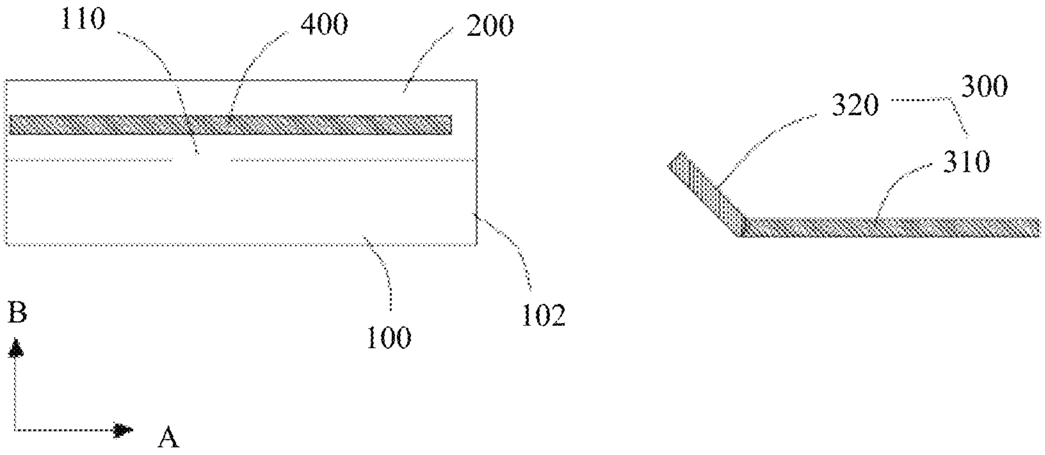
FIG. 5 is a schematic diagram of a scenario in which a first signal cable is not installed in a first cavity according to an implementation of this application.
Figure 6A:
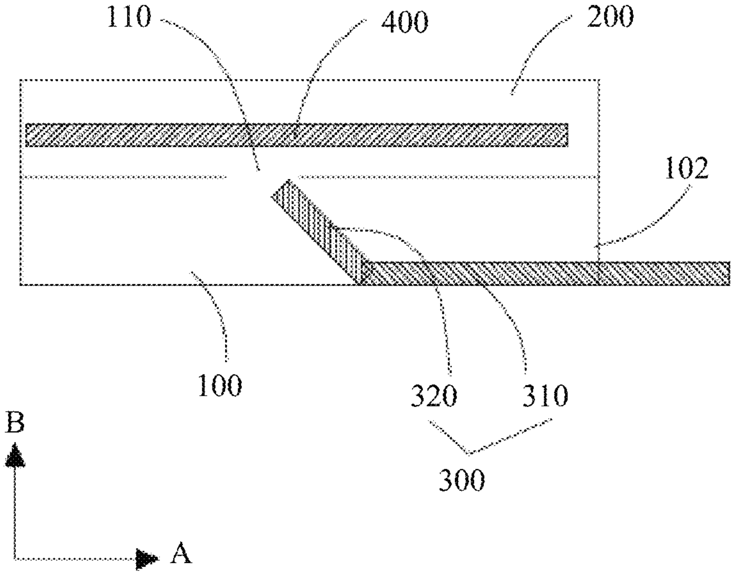
FIG. 6*a* is a schematic diagram of a scenario in which a first signal cable is pushed into a first cavity according to an implementation of this application.
Figure 6B:
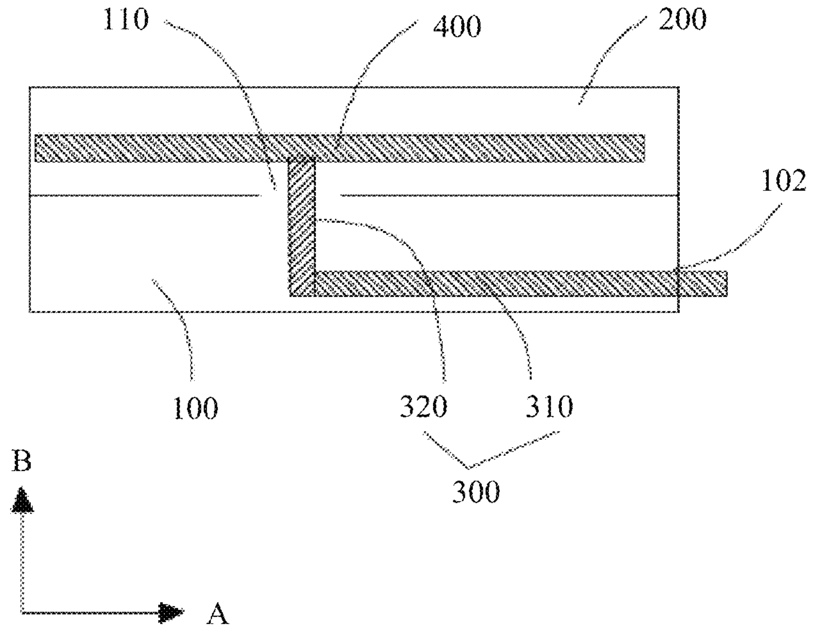
FIG. 6*b* is a schematic diagram of a scenario in which a first signal cable is connected with a second signal cable in a cavity according to an implementation of this application.

Refer to FIG. 4 to FIG. 6*b*. FIG. 4 is a schematic diagram of a structure in which a first signal cable 300 is not disposed in a first cavity 100. Both the first cavity 100 and a second cavity 200 extend along a first direction A. The first cavity 100 and the second cavity 200 are disposed in parallel. A first elastic bending part 320 extends along a second direction B, and a length of the first elastic bending part 320 in the second direction B is greater than a length of the first cavity 100 in the second direction B. The first cavity 100 includes a first opening 102 at one end in the first direction A. A length of the first opening 102 in the second direction B is less than the length of the first elastic bending part 320 in the second direction B. When the first elastic bending part 320 is not elastic or the first elastic bending part 320 cannot be deformed towards an extension direction of a first main part 310, the first elastic bending part 320 cannot be placed into the first cavity 100 through the first opening 102. However, as shown in FIG. 5, in this application, because the first elastic bending part 320 is elastic, the first elastic bending part 320 can be deformed along an extension line of the first main part 310. When the first signal cable 300 is placed into the first cavity 100, the first elastic bending part 320 is squeezed towards the extension direction of the first main part 310, so that a length of the compressed first elastic bending part 320 in the second direction B is less than or equal to the length of the first cavity 100 in the second direction B. In this case, the first elastic bending part 320 may be pushed into the first cavity 100, and then the first main part 310 is pushed into the first cavity 100. As shown in FIG. 6*a*, when one end of the first elastic bending part 320 away from the first main part 310 reaches a location of a first hole 110, because the first hole 110 is free space with no barrier, the end of the first elastic bending part 320 away from the first main part 310 extends into the first hole 110. The first elastic bending part 320 is restored to an original shape, and the restored first elastic bending part 320 is not squeezed. In this case, the length of the first elastic bending part 320 in the second direction B is greater than the length of the first cavity 100 in the second direction B. The end of the first elastic bending part 320 away from the first main part 310 extends into the second cavity 200 through the first hole 110 (as shown in FIG. 6*b*). When no external force acts on the first elastic bending part 320, the first elastic bending part 320 is confined to the first hole 110, and then the first elastic bending part 320 is connected to a second signal cable 400, to facilitate installation.

According to the feed structure 10 of the antenna 1 provided in this application, in one aspect, the deformable first elastic bending part 320 is disposed at one end of the first signal cable 300. When the deformable first elastic bending part 320 extends into the first cavity 100 in a compressed state, the length of the first cavity 100 in the second direction B may be set smaller, and space of the feed structure 10 is saved and weight is reduced. In another aspect, when the first elastic bending part 320 is pushed into the first hole 110, the first elastic bending part 320 that is restored to an original shape is pushed into the first hole 110 when being pushed to the location of the first hole 110, so that the first elastic bending part 320 and the second signal cable 400 are easily installed and connected.

Figure 7:
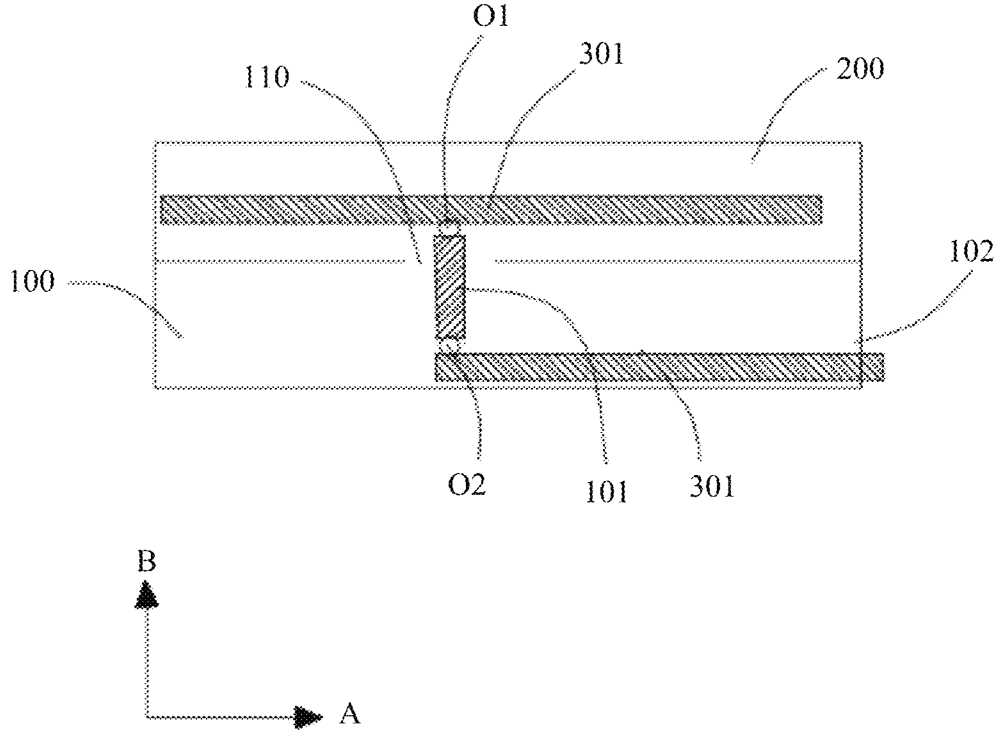
FIG. 7 is a schematic diagram of a scenario in which a first signal cable is connected with a second signal cable in a current technology.
Figure 8:
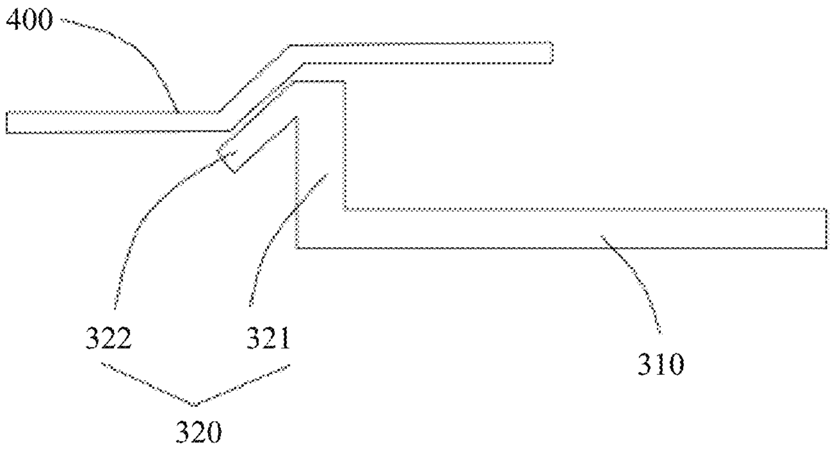
FIG. 8 is a schematic diagram of a location at which a first signal cable is connected with a second signal cable according to an implementation of this application.
Figure 9:
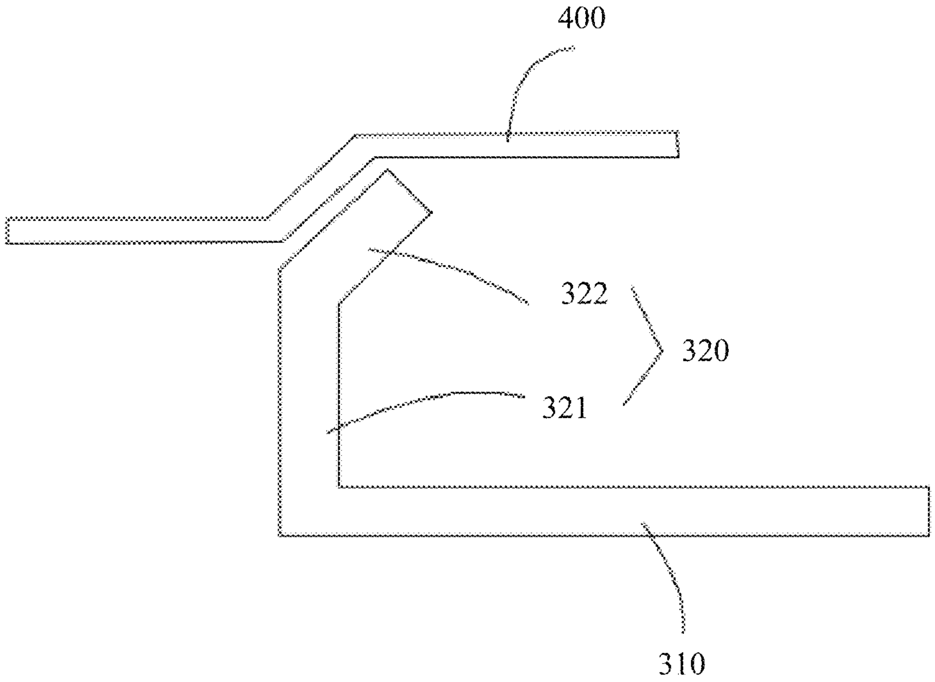
FIG. 9 is a schematic diagram of a location at which a first signal cable is connected with a second signal cable according to an implementation of this application.

In a possible implementation, the first main part 310 and the first elastic bending part 320 are integrally formed. Refer to FIG. 7. Currently, two signal cables 301 of a first cavity 100 and a second cavity 200 are electrically connected through a signal connector 101. The two signal cables 301 of the first cavity 100 and the second cavity 200 are respectively welded at two ends of the signal connector 101.

Two welding joints O1 and O2 are provided. More welding joints indicate worse signal transmission characteristics and worse structure strength of signal cables. However, in this implementation, the first elastic bending part 320 may extend into the second cavity 200 and be connected to the second signal cable 400 through the first hole 110. Only the end of the first elastic bending part 320 away from the first main part 310 needs to be welded to the second signal cable 400. In other words, there is one welding joint. This improves the signal transmission characteristics and the structure strength.

Refer to FIG. 3 again. In a possible implementation, the first elastic bending part 320 includes a first bending sub-part 321 and a second bending sub-part 322. The first bending sub-part 321 is located between the second bending sub-part 322 and the first signal cable 300. An extension direction of the first bending sub-part 321 intersects with the first direction A. The second bending sub-part 322 is electrically connected to the second signal cable 400. In other words, in this implementation, the first bending sub-part 321 is deformed towards the extension direction of the first main part 310. An extension direction of the second bending sub-part 322 and the extension direction of the first bending sub-part 321 may be at any angle to adapt to second signal cables 400 of different shapes in the second cavity 200 or signal cables in cavities at different locations, or adapt to different location parts of the second signal cable 400 or different plane parts of the second signal cable 400. For example, FIG. 3, FIG. 8, FIG. 9, and FIG. 10 show four different implementations.

Refer to FIG. 1 and FIG. 3 again. In a possible implementation, the extension direction of the second bending sub-part 322 is parallel to an extension direction of the second signal cable 400. The extension direction of the second signal cable 400 is an entire extension direction of the second signal cable 400. In this implementation, a contact area of the second bending sub-part 322 and the second signal cable 400 may be increased, to improve signal transmission stability and the structure strength. In this implementation, the extension direction of the second signal cable 400 and the second bending sub-part 322 is the first direction A. In some implementations, an area of the second bending sub-part 322 may be set larger, to increase a connection contact area.

Figure 10:
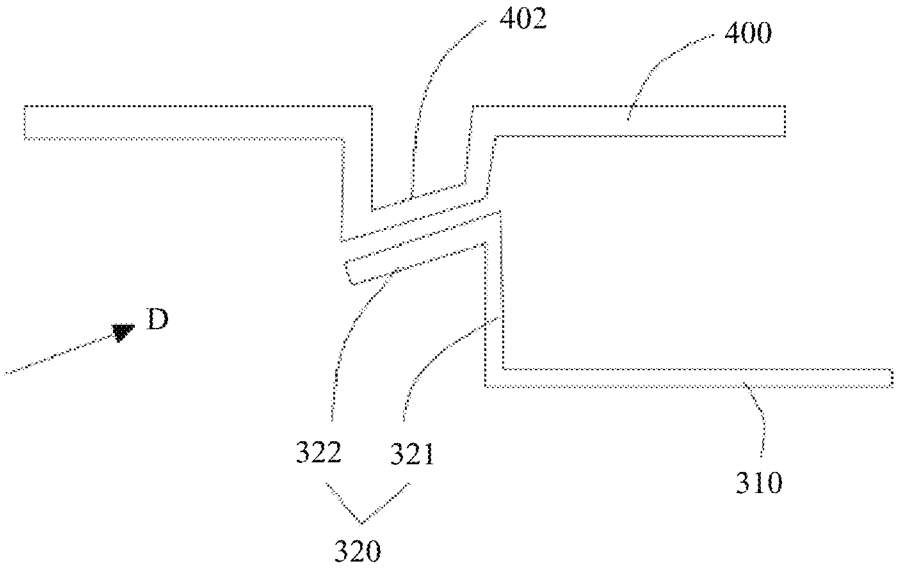
FIG. 10 is a schematic diagram of a location at which a first signal cable is connected with a second signal cable according to an implementation of this application.

Refer to FIG. 10. In a possible implementation, a second signal cable 400 includes a connection part 402, where the connection part 402 is for connecting to a first signal cable 300, and an extension direction of a second bending sub-part 322 is parallel to an extension direction of the connection part 402. In this implementation, the extension direction of the second bending sub-part 322 may not be parallel to an extension direction of the second signal cable 400, but is parallel to the extension direction of the connection part 402, to increase a contact area of a signal connection location. In this implementation, both the extension direction of the second bending sub-part 322 and the extension direction of the connection part 402 are a fourth direction D, and there is an angle between the fourth direction D and a first direction A.

Refer to FIG. 3 again. In a possible implementation, a connection hole 323 penetrating the first elastic bending part 320 is disposed on the first elastic bending part 320. The connection hole 323 facilitates fastening relative locations of the first signal cable 300 and the second signal cable 400 during welding. For example, a fastener may pass through the connection hole 323 to enable the first signal cable 300 and the second signal cable 400 to be close to each other. The first signal cable 300 and the second signal cable 400 are prevented from shaking during welding.

Figure 11:
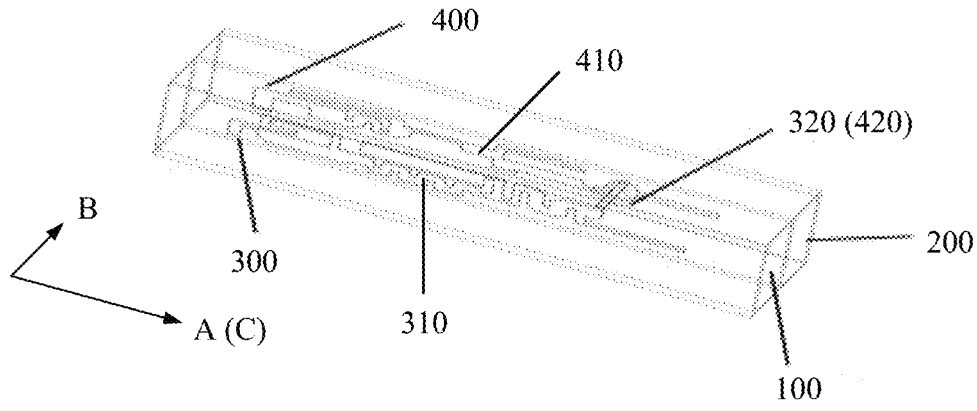
FIG. 11 is a schematic diagram of a three-dimensional structure of a feed structure of an antenna according to an implementation of this application.
Figure 12:
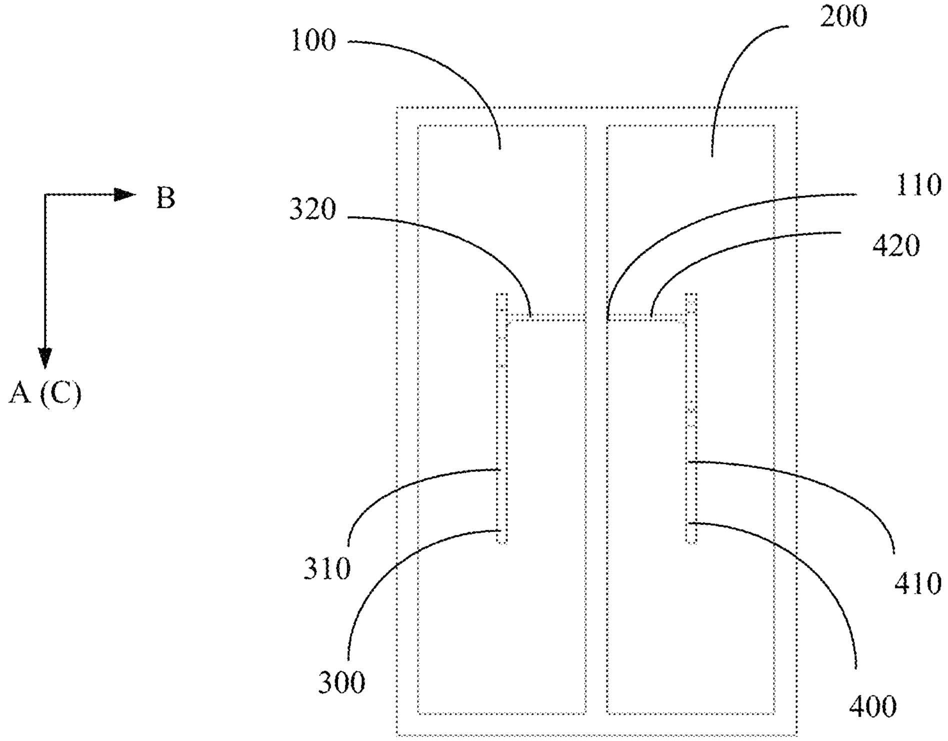
FIG. 12 is a top view of a feed structure of an antenna according to an implementation of this application.

Refer to FIG. 11 and FIG. 12. In a possible implementation, a second signal cable 400 includes a second main part 410 and a second elastic bending part 420 located at one end of the second main part 410. The second main part 410 extends along a third direction C. An extension direction of the second elastic bending part 420 intersects with the third direction C. The second elastic bending part 420 can be deformed towards the extension direction of the second main part 410. A first elastic bending part 320 and the second elastic bending part 420 are connected through a first hole 110. A first signal cable 300 and the second signal cable 400 are connected through respective elastic bending parts of the first signal cable 300 and the second signal cable 400 to implement a signal connection. In this implementation, an extension direction of a first cavity 100 is the same as an extension direction of a second cavity 200. The third direction C is parallel to a first direction A, or an extension direction of the first signal cable 300 is parallel to an extension direction of the second signal cable 400. The extension direction of the second elastic bending part 420 is parallel to an extension direction of the first elastic bending part 320. The second elastic bending part 420 and the first elastic bending part 320 may be superimposed together and then may be connected by welding. In some implementations, an angle may be provided between the third direction C and the first direction A.

Figure 13:
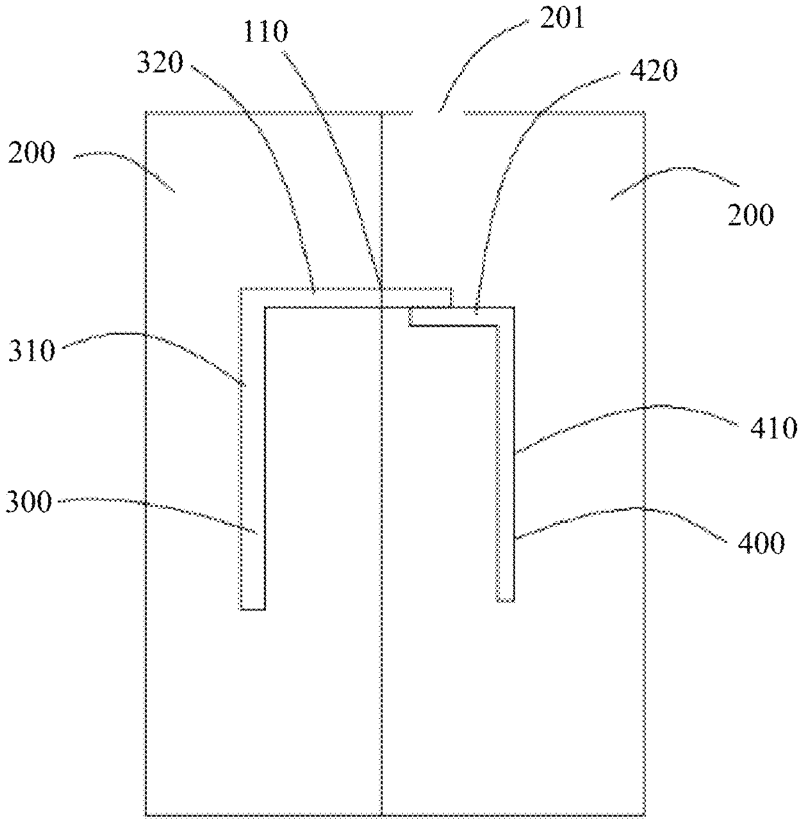
FIG. 13 is a schematic diagram of a structure of a connection between a first signal cable and a second signal cable in a second cavity according to an implementation of this application.

Refer to FIG. 13. In a possible implementation, a second elastic bending part 420 is located in a second cavity 200, and a connection part between a first elastic bending part 320 and the second elastic bending part 420 is located in the second cavity 200. In this implementation, an entire second signal cable 400 is located in the second cavity 200. In this implementation, a first connection groove 201 may be disposed on a side wall of the second cavity 200, and the first elastic bending part 320 and the second elastic bending part 420 are welded inside the second cavity 200 through the first connection groove 201. The side wall on which the groove is disposed is different from a side wall on which a first hole 110 is located. As shown in FIG. 13, the side wall on which the first connection groove 201 is located is adjacent to a side wall on which the first hole 110 is located and that corresponds to the second cavity 200. The first elastic bending part 320 and the second elastic bending part 420 are welded inside the second cavity 200 through the first connection groove 201.

Figure 14:
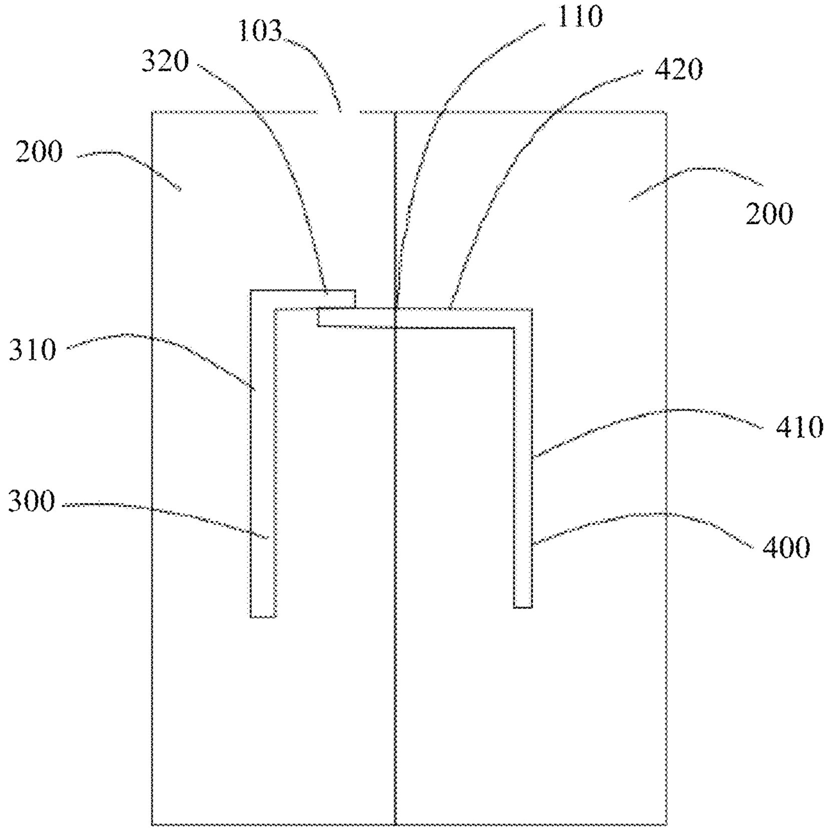
FIG. 14 is a schematic diagram of a structure of a connection between a first signal cable and a second signal cable in a first cavity according to an implementation of this application.

Refer to FIG. 14. In a possible implementation, one end of a second elastic bending part 420 away from a second main part 410 passes through a first hole 110, and a connection part between a first elastic bending part 320 and the second elastic bending part 420 is located in a first cavity 100. In this implementation, the end of the second elastic bending part 420 away from the second main part 410 is located in the first cavity 100. In this implementation, a second connection groove 103 may be disposed on a side wall of the first cavity 100, and the first elastic bending part 320 and the second elastic bending part 420 are welded inside the first cavity 100 through the second connection groove 103. The side wall on which the second connection groove 103 is located is different from a side wall on which the first hole 110 is located. As shown in FIG. 14, the side wall on which the second connection groove 103 is located is adjacent to a side wall on which the first hole 110 is located and that corresponds to the first cavity 100. The first elastic bending part 320 and the second elastic bending part 420 are welded inside the first cavity 100 through the second connection groove 103.

Figure 15:
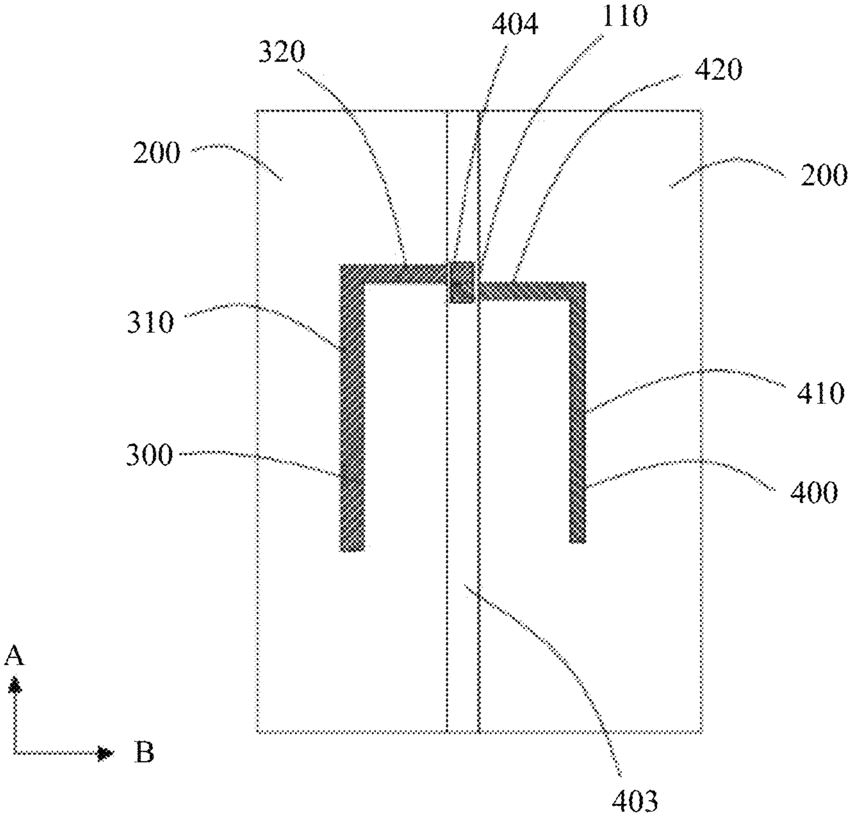
FIG. 15 is a schematic diagram of a structure of a connection between a first signal cable and a second signal cable in a first hole according to an implementation of this application.

Refer to FIG. 15. In a possible implementation, one end of a second elastic bending part 420 away from a second main part 410 passes through a first hole 110, and a connection part between a first elastic bending part 320 and the second elastic bending part 420 is located in the first hole 110. The first hole 110 is disposed on a side wall shared between a first cavity 100 and a second cavity 200, or is disposed on adjacent side walls between a first cavity 100 and a second cavity 200. In this implementation, the side wall shared between the first cavity 100 and the second cavity 200 is a common side wall 403, and the common side wall 403 is perpendicular to a plane in which a first direction A and a second direction B are located. The common side wall 403 has a specific thickness. A length of the first hole 110 is the same as the thickness of the common side wall 403. A length direction of the first hole 110 is the same as an extension direction of the first elastic bending part 320. A third connection groove 404 may be disposed on the common side wall 403 shared between the first cavity 100 and the second cavity 200, and the first elastic bending part 320 and the second elastic bending part 420 are welded inside the first hole 110 through the third connection groove 404.

Figure 16:
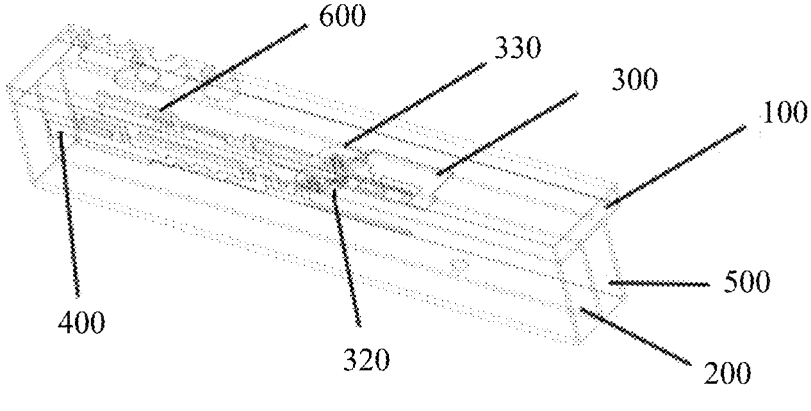
FIG. 16 is a schematic diagram of a three-dimensional structure of a feed structure of an antenna according to an implementation of this application.
Figure 17:
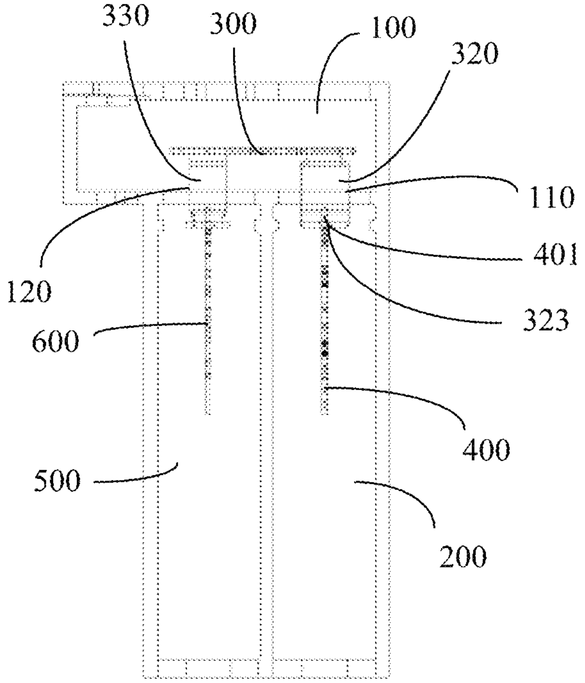
FIG. 17 is a top view of a feed structure of an antenna according to an implementation of this application.
Figure 18:
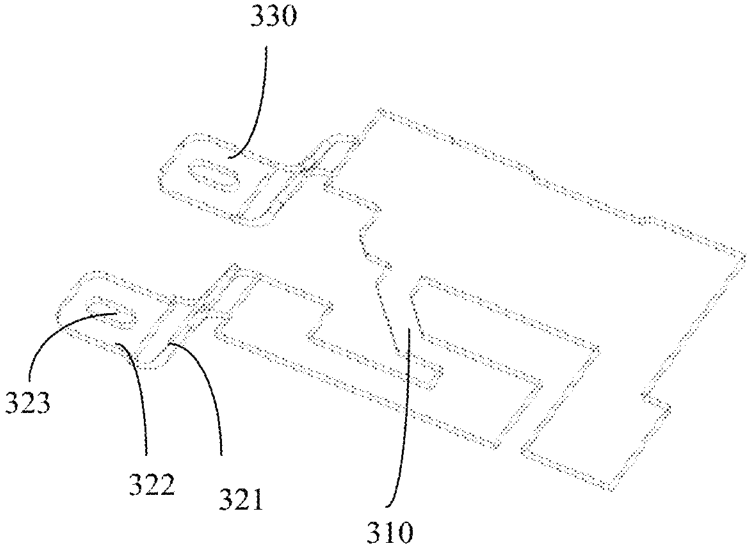
FIG. 18 is a schematic diagram of a structure of a first signal cable in a feed structure of an antenna according to an implementation of this application.

Refer to FIG. 16 to FIG. 18. In a possible implementation, the feed structure 10 further includes a third cavity 500 and a third signal cable 600. The third signal cable 600 is located in the third cavity 500. The third cavity 500 and a second cavity 200 are disposed in parallel on one side of a first cavity 100. A second hole 120 is provided between the first cavity 100 and the third cavity 500 (as shown in FIG. 17). The first cavity 100 and the third cavity 500 are connected through the second hole 120. A first signal cable 300 further includes a third elastic bending part 330 located at one end of a first main part 310. A length of the third elastic bending part 330 in a second direction B is greater than a length of the first cavity 100 in the second direction B. One end of the third elastic bending part 330 away from the first main part 310 is connected to the third signal cable 600 through the second hole 120. In this implementation, the third elastic bending part 330 and a first elastic bending part 320 are located at a same end of the first main part 310 (as shown in FIG. 18). In other words, one end of the first signal cable 300 is connected to both a second signal cable 400 and the third signal cable 600 through the first elastic bending part 320 and the third elastic bending part 330 respectively.

Refer to FIG. 17 and FIG. 18. In a possible implementation, a connection hole 323 penetrating a second bending sub-part 322 is disposed on the second bending sub-part 322. A convex part 401 is disposed on the second signal cable 400 (as shown in FIG. 17), and the convex part 401 passes through the connection hole 323. In this implementation, the connection hole 323 is disposed on the second bending sub-part 322 (as shown in FIG. 18). The convex part 401 and the connection hole 323 may be used to fasten the second bending sub-part 322 and the second signal cable 400 when the second bending sub-part 322 and the second signal cable 400 are welded. This prevents the second bending sub-part 322 and the second signal cable 400 from shaking in a welding process, which is unfavorable to welding.

In some implementations, the feed structure 10 further includes the third cavity 500 and the third signal cable 600. The third signal cable 600 is located in the third cavity 500. The third cavity 500 and the second cavity 200 are disposed in parallel on one side of the first cavity 100. The second hole 120 is provided between the first cavity 100 and the third cavity 500. The third signal cable 600 includes a third main part and a fourth elastic bending part located at one end of the third main part. One end of the fourth elastic bending part away from the third main part is connected to the first signal cable 300 through the second hole 120. In other words, in this implementation, the third signal cable 600 is connected to the first signal cable 300 through the fourth elastic bending part. The second signal cable 400 is connected to the first signal cable 300 through the first elastic bending part 320.

In this application, the first cavity 100, the second cavity 200, and the third cavity 500 may further include functional units such as a phase shifter, a filter unit, a combiner unit, a power splitting unit, or a radiating element, in another feed structure. This is not limited in this application. The first cavity 100, the second cavity 200, and the third cavity 500 may be cavities in the feed structure 10 that are used to accommodate the phase shifter, the filter unit, the combiner unit, the power splitting unit, or the radiating element. In other words, the cavities are provided in the feed structure. The first elastic bending part 320 in the first signal cable 300 in the feed structure 10 provided in this application may be applicable to any structure that needs to connect signals in two cavities, and may be applicable to between two cavities deformed at any location or between two cavities deformed in shape. When there are a plurality of signal cables and elastic bending parts, the first elastic bending part 320 may be applicable to connections of signal cables in a plurality of cavities.

In this application, the first elastic bending part 320 may be formed by bending one end of the first signal cable 300, to be specific, a material for forming the first signal cable 300 has specific deformation and can transmit a radio frequency signal. Alternatively, the first elastic bending part 320 is integrally formed by one end of the first main part 310 of a material with a deformation capability, where the material forming the first elastic bending part 320 not only has the specific deformation, but also can transmit the radio frequency signal. Similarly, the second elastic bending part 420 may be formed by bending one end of the second signal cable 400, and a material for forming the second signal cable 400 has specific deformation and can transmit a radio frequency signal. Alternatively, the second elastic bending part 420 is integrally formed by one end of the second main part 410 of a material with a deformation capability, where the material forming the second elastic bending part 420 not only has the specific deformation, but also can transmit the radio frequency signal. The first signal cable 300, the second signal cable 400, and the third signal cable 600 may be a metal strip line or a PCB board, where the metal strip line may be a sheet metal strip line.

A location of a first hole 110 may be set based on an actual location at which the first signal cable 300 and the second signal cable 400 need to be connected. In this embodiment, the first hole 110 is disposed on a common side wall of the first cavity 100 and the second cavity 200. In some implementations, holes may alternatively be separately disposed at corresponding locations of the first cavity 100 and the second cavity 200. The first elastic bending part 320 may pass through the corresponding holes of the first cavity 100 and the second cavity 200. In this application, the first cavity 100, the second cavity 200, and the third cavity 500 may be an extrude cavity or a plastic electroplating cavity.

Figure 19:
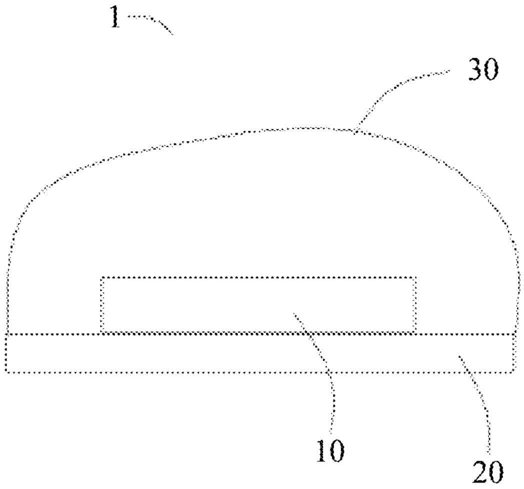
FIG. 19 is a schematic diagram of a structure of an antenna according to an implementation of this application.

Refer to FIG. 19. An implementation of this application provides an antenna 1, where the antenna 1 includes the feed structure 10 according to any one of the foregoing implementations. The antenna 1 further includes a reflection plate 20 and a radome 30. The feed structure 10 is located between the reflection plate 20 and the radome 30. In this implementation, the feed structure 10 is a part of a feed network in the antenna 1, where the feed network further includes a phase shift power splitting unit, a radiating element, and the like. The reflection plate 20 is used to reflect a signal, improve sensitivity of the antenna 1 to send or receive a signal, and concentrate the reflected signal on a receiving point of the antenna 1. This not only greatly enhances a receiving or sending capability of the antenna 1, but also blocks or shields interference of another radio wave from a rear side of the reflection plate 20 to a signal. A material of the reflection plate 20 may be metal. The radome 30 has good electromagnetic wave penetration characteristics, and can withstand harsh external environment and protect the antenna 1 from being affected by the external environment. In some implementations, one side wall of the first cavity 100 and the second cavity 200 is used to serve as the reflection plate 20, or one side wall of the first cavity 100, the second cavity 200, and the third cavity 500 is used to serve as the reflection plate 20.

Figure 20:
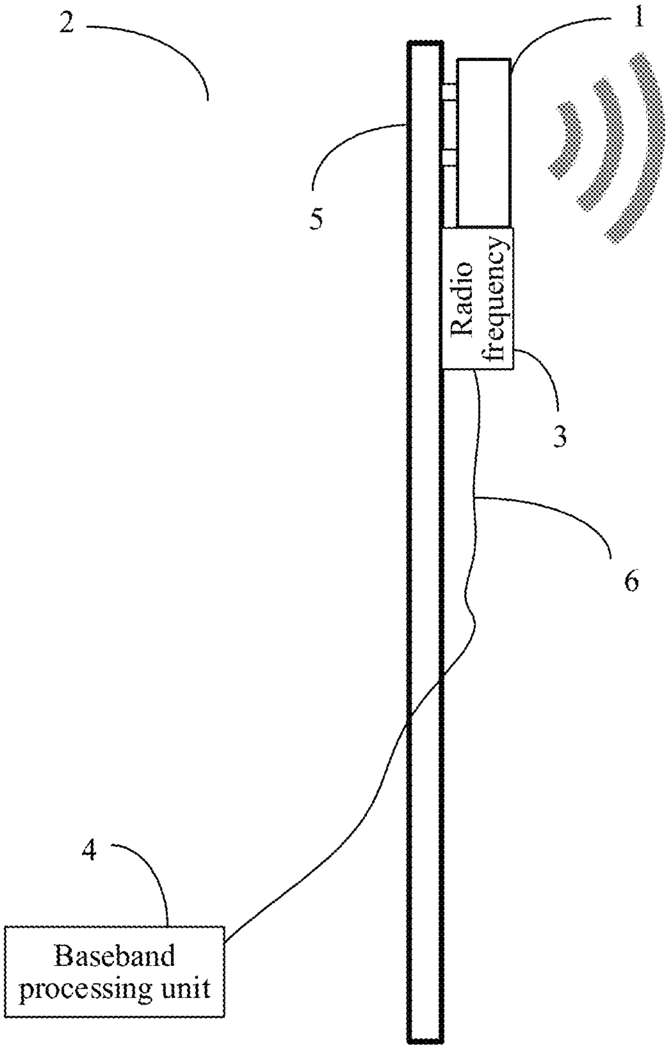
FIG. 20 is a schematic diagram of a structure of a communication device according to an implementation of this application.

Refer to FIG. 20. An implementation of this application further provides a communication device 2, including the antenna 1 according to any one of the foregoing implementations. There may be a plurality of antennas 1, and the plurality of antennas 1 are distributed in an array. Each antenna 1 has a feed network, and the feed network in each antenna 1 may correspond to different frequency bands. Same frequency bands in the antennas 1 correspond to different radiation directions. The feed network includes the feed structure 10 according to the foregoing implementations.

In some implementations, the communication device 2 further includes a radio frequency processing unit 3 and a baseband processing unit 4. The baseband processing unit 4 is connected to the feed structure 10 in the antenna 1 through the radio frequency processing unit 3. The antenna 1 is used to transmit a received radio signal to the radio frequency processing unit 3, or convert a sent signal of the radio frequency processing unit 3 into an electromagnetic wave and send the electromagnetic wave. The radio frequency processing unit 3 is electrically connected to the feed structure 10 in the antenna 1. The radio frequency processing unit 3 is configured to perform frequency selection, amplification, and down-conversion processing on the radio signal received by the antenna 1, and convert the radio signal into an intermediate frequency signal or a baseband signal to send the intermediate frequency signal or the baseband signal to the baseband processing unit 4. Alternatively, the radio frequency processing unit 3 is configured to perform up-conversion and amplification on a baseband signal or an intermediate frequency signal sent by the baseband processing unit 4, and send the baseband signal or the intermediate frequency signal through an antenna. The baseband processing unit 4 is configured to process the intermediate frequency signal or the baseband signal sent by the radio frequency processing unit 3.

In an implementation, the radio frequency processing unit 3 is integrally disposed with the antenna 1. The antenna 1 is installed on a pole 5 or a tower. The radio frequency processing unit 3 is integrally disposed with the antenna 1. The baseband processing unit 4 is located at a remote end of the antenna 1, and is connected to the radio frequency processing unit 3 through a cable 6. In some implementations, both the radio frequency processing unit 3 and the baseband processing unit 4 may be located at a remote end of an antenna 1.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A feed structure of an antenna, comprising a first cavity, a second cavity, a first signal cable, and a second signal cable, wherein:

the first signal cable is located in the first cavity, the first signal cable comprises a first main part and a first elastic bending part located at one end of the first main part, the first main part extends along a first direction, an extension direction of the first elastic bending part intersects with the first direction, and the first elastic bending part can be deformed towards the extension direction of the first main part;

the second signal cable is located in the second cavity, a first hole is provided between the first cavity and the second cavity, the first cavity and the second cavity are connected through the first hole, a length of the first elastic bending part in a second direction is greater than a length of the first cavity in the second direction, the second direction intersects with the first direction, and one end of the first elastic bending part away from the first main part is connected to the second signal cable through the first hole; and the first signal cable and the second signal cable are used to transmit signals, and a material of the first elastic bending part has a deformation capability.

2. The feed structure of the antenna according to claim 1, wherein the first main part and the first elastic bending part are integrally formed.

3. The feed structure of the antenna according to claim 1, wherein the first elastic bending part comprises a first bending sub-part and a second bending sub-part, the first bending sub-part is located between the second bending sub-part and the first signal cable, an extension direction of the first bending sub-part intersects with the first direction, and the second bending sub-part is electrically connected to the second signal cable.

4. The feed structure of the antenna according to claim 3, wherein an extension direction of the second bending sub-part is parallel to an extension direction of the second signal cable.

5. The feed structure of the antenna according to claim 1, wherein a connection hole penetrating the first elastic bending part is disposed on the first elastic bending part, a convex part is disposed on the second signal cable, and the convex part passes through the connection hole.

6. The feed structure of the antenna according to claim 1, wherein the second signal cable comprises a second main part and a second elastic bending part located at one end of the second main part, the second main part extends along a third direction, an extension direction of the second elastic bending part intersects with the third direction, the second elastic bending part can be deformed towards the extension direction of the second main part, and the first elastic bending part and the second elastic bending part are connected through the first hole.

7. The feed structure of the antenna according to claim 6, wherein the second elastic bending part is located in the second cavity, and a connection part between the first elastic bending part and the second elastic bending part is located in the second cavity.

8. The feed structure of the antenna according to claim 6, wherein one end of the second elastic bending part away from the second main part passes through the first hole, and a connection part between the first elastic bending part and the second elastic bending part is located in the first cavity.

9. The feed structure of the antenna according to claim 6, wherein one end of the second elastic bending part away from the second main part passes through the first hole, and a connection part between the first elastic bending part and the second elastic bending part is located in the first hole.

10. The feed structure of the antenna according to claim 1, wherein the feed structure further comprises a third cavity and a third signal cable, the third signal cable is located in the third cavity, the third cavity and the second cavity are disposed in parallel on one side of the first cavity, a second hole is provided between the first cavity and the third cavity, the first cavity and the third cavity are connected through the second hole, the first signal cable further comprises a third elastic bending part located at one end of the first main part, a length of the third elastic bending part in the second direction is greater than a length of the first cavity in the second direction, and one end of the third elastic bending part away from the first main part is connected to a third signal through the second hole.

11. An antenna, wherein the antenna comprises a feed structure, wherein the feed structure comprises a first cavity, a second cavity, a first signal cable, and a second signal cable, and wherein:

the first signal cable is located in the first cavity, the first signal cable comprises a first main part and a first elastic bending part located at one end of the first main part, the first main part extends along a first direction, an extension direction of the first elastic bending part intersects with the first direction, and the first elastic bending part can be deformed towards the extension direction of the first main part;

the second signal cable is located in the second cavity, a first hole is provided between the first cavity and the second cavity, the first cavity and the second cavity are connected through the first hole, a length of the first elastic bending part in a second direction is greater than a length of the first cavity in the second direction, the second direction intersects with the first direction, and one end of the first elastic bending part away from the first main part is connected to the second signal cable through the first hole; and the first signal cable and the second signal cable are used to transmit signals, and a material of the first elastic bending part has a deformation capability.

12. The antenna according to claim 11, wherein the first main part and the first elastic bending part are integrally formed.

13. The antenna according to claim 11, wherein the first elastic bending part comprises a first bending sub-part and a second bending sub-part, the first bending sub-part is located between the second bending sub-part and the first signal cable, an extension direction of the first bending sub-part intersects with the first direction, and the second bending sub-part is electrically connected to the second signal cable.

14. The antenna according to claim 13, wherein an extension direction of the second bending sub-part is parallel to an extension direction of the second signal cable.

15. The antenna according to claim 11, wherein a connection hole penetrating the first elastic bending part is disposed on the first elastic bending part, a convex part is disposed on the second signal cable, and the convex part passes through the connection hole.

16. The antenna according to claim 11, wherein the second signal cable comprises a second main part and a second elastic bending part located at one end of the second main part, the second main part extends along a third direction, an extension direction of the second elastic bending part intersects with the third direction, the second elastic bending part can be deformed towards the extension direction of the second main part, and the first elastic bending part and the second elastic bending part are connected through the first hole.

17. The antenna according to claim 16, wherein the second elastic bending part is located in the second cavity, and a connection part between the first elastic bending part and the second elastic bending part is located in the second cavity.

18. The antenna according to claim 16, wherein one end of the second elastic bending part away from the second main part passes through the first hole, and a connection part between the first elastic bending part and the second elastic bending part is located in the first cavity.

19. The antenna according to claim 16, wherein one end of the second elastic bending part away from the second main part passes through the first hole, and a connection part between the first elastic bending part and the second elastic bending part is located in the first hole.

20. A communication device, wherein the communication device comprises at least one processor and an antenna, wherein the at least one processor is electrically connected to a feed structure of the antenna, wherein the feed structure comprises a first cavity, a second cavity, a first signal cable, and a second signal cable, and wherein:

the first signal cable is located in the first cavity, the first signal cable comprises a first main part and a first elastic bending part located at one end of the first main part, the first main part extends along a first direction, an extension direction of the first elastic bending part intersects with the first direction, and the first elastic bending part can be deformed towards the extension direction of the first main part;

the second signal cable is located in the second cavity, a first hole is provided between the first cavity and the second cavity, the first cavity and the second cavity are connected through the first hole, a length of the first elastic bending part in a second direction is greater than a length of the first cavity in the second direction, the second direction intersects with the first direction, and one end of the first elastic bending part away from the first main part is connected to the second signal cable through the first hole; and the first signal cable and the second signal cable are used to transmit signals, and a material of the first elastic bending part has a deformation capability.

* * * * *